US011791752B2

(12) United States Patent
Rice et al.

(10) Patent No.: US 11,791,752 B2
(45) Date of Patent: Oct. 17, 2023

(54) MOTOR CIRCUIT

(71) Applicant: ZF Automotive UK Limited, Solihull (GB)

(72) Inventors: Nathanael Rice, Edwalton (GB); Maciej Kudanowski, Solihull (GB)

(73) Assignee: ZF Automotive UK Limited, Solihull (GB)

( * ) Notice: Subject to any disclaimer, the term of this patent is extended or adjusted under 35 U.S.C. 154(b) by 0 days.

(21) Appl. No.: 15/809,006

(22) Filed: Nov. 10, 2017

(65) Prior Publication Data

US 2018/0138838 A1 May 17, 2018

(30) Foreign Application Priority Data

Nov. 11, 2016 (GB) ..................................... 1619147

(51) Int. Cl.
| | |
|---|---|
| *H02P 5/51* | (2016.01) |
| *H02M 1/088* | (2006.01) |
| *H02P 6/00* | (2016.01) |
| *H02M 7/5387* | (2007.01) |
| *H02K 11/33* | (2016.01) |
| *H02K 11/27* | (2016.01) |
| *H02M 1/00* | (2006.01) |

(52) U.S. Cl.
CPC .............. *H02P 5/51* (2016.02); *H02M 1/088* (2013.01); *H02P 6/005* (2013.01); *H02K 11/27* (2016.01); *H02K 11/33* (2016.01); *H02M 1/0009* (2021.05); *H02M 7/53871* (2013.01)

(58) Field of Classification Search
CPC ............ H02P 5/51; H02P 6/005; H02M 1/088
USPC .......................................................... 318/45
See application file for complete search history.

(56) References Cited

U.S. PATENT DOCUMENTS

| | | | |
|---|---|---|---|
| 5,414,339 A | 5/1995 | Masaki et al. | |
| 10,181,812 B2* | 1/2019 | Dal | .......................... H02P 21/13 |
| 10,243,503 B2* | 3/2019 | Koseki | ..................... H02P 27/08 |
| 2013/0241452 A1* | 9/2013 | Suzuki | ................. B62D 5/0403 |
| | | | 318/400.15 |

(Continued)

FOREIGN PATENT DOCUMENTS

CN 106031021 A 10/2016

OTHER PUBLICATIONS

Patents Act 1977: Search Report under Section 17(5), Application No. GB1619147.0, dated Mar. 22, 2017.

(Continued)

*Primary Examiner* — Kawing Chan
*Assistant Examiner* — Zemenay T Truneh
(74) *Attorney, Agent, or Firm* — MacMillan, Sobanski & Todd, LLC

(57) ABSTRACT

A motor circuit for driving a motor having two independent sets of windings forming 3 or more phases, wherein each phase of a first set is paired with a respective phase of a second set. A first bridge driver circuit has a top side switch and a bottom side switch driving each phase of the first set, and a second bridge driver circuit has a top side switch and a bottom side switch driving each phase of the second set. First and second current determining means determine current flowing in each respective sets of windings independent of the current flowing in the other set of phase windings. A third current determining means is configured to determine the sum of the current flowing in each pair of the N pairs of phases of the motor.

12 Claims, 3 Drawing Sheets

(56) References Cited

U.S. PATENT DOCUMENTS

| | | | |
|---|---|---|---|
| 2014/0019008 A1* | 1/2014 | Nakamura | B62D 6/008 |
| | | | 701/42 |
| 2016/0149530 A1 | 5/2016 | Dal | |
| 2016/0164278 A1* | 6/2016 | Hayashi | G01R 31/50 |
| | | | 318/139 |
| 2017/0012569 A1 | 1/2017 | Koseki et al. | |

OTHER PUBLICATIONS

First Chinese Office Action, Application No. 201711114023.5, dated Sep. 30, 2022.

* cited by examiner

MOTOR CIRCUIT

CROSS-REFERENCE TO RELATED APPLICATIONS

This application claims priority to Great Britain Patent Application No. 1619147.0, filed 11 Nov. 2016, the disclosures of which are incorporated herein by reference in entirety.

BACKGROUND OF THE INVENTION

This invention relates to improvements in motor circuits, in particular circuits for the control and drive of a multiphase electric motor. The invention may be applied to motors in a wide range of applications, such as electric power assisted steering systems.

It is known to provide a motor control and drive circuit for a multiple phase electric motor which has at least three phases, in which the phases are connected to a driver circuit arranged as a drive bridge. The bridge comprises, for each phase of the motor, a top side drive switch that selectively connects the phase to a positive supply, and a bottom side drive switch that selectively connects the phase a negative or earth supply. A controller produces pulse width modulated signals that are applied to the switches of the bridge, causing currents to flow through the phases of the motor. By careful selection of the modulation strategy of the switches the speed, direction of rotation, and the torque of the motor can be controlled.

In a typical control and drive circuit, a measurement of the current flowing through the motor is used as an input to the controller, with the controller modulating the switches so as to bring the motor current in line with a target current that corresponds to the desired speed/direction/torque. A current sense resistor may be provided in a common output line from the motor through which the current from the motor must pass, the voltage dropped across the resistor providing the indication of the current based on the application or Ohms law. By careful selection of the modulation of the bridge switches this one sensor can provide a measurement of the current in each of the three (or more) phases of the motor.

In many cases, the motor must be able to continue to operate in the event of a fault such as a short circuit in the motor or the bridge driver circuit. It has been proposed to ensure that the motor can continue to operate by providing two sets of independent phases windings, each one being driven by an independent bridge driver. For instance, for a three phase motor there may be two independent sets of three phase windings and two bridge drivers. In use, one of the drivers may act as a master to provide current to the associated set of windings whilst the other driver is inoperative and provides no currents. If a fault is detected at the master then this may be switched off and the other driver used instead to provide currents to its associated windings. In an alternative both bridge drivers may normally be operated at the same time, both providing drive currents, and if one fails it may be switched off and the remaining driver used to provide the required currents. The remaining driver could provide increased currents in such a fault to keep the motor operating at the same level, or the motor may simply operate at a reduced level of performance.

Where two bridge drivers are provided, it is also known to provide independent controllers for each driver to give further resilience to faults in the controller. However in many cases it is sufficient to share one controller across two drivers.

Where two bridge drivers and sets of phase windings are provided, it is known from the prior art to provide two current sensors, one for each set of phases. Each one provides a measurement of the current flowing in the respective set of phases. Prior art FIG. 1 shows the current sense resistors 1, 2 in a prior art motor control and drive circuit 3. The circuit includes to bridge drivers 4, 5 with top side switches (typically MOSFETS) 8 and bottom side switches 7. Each bridge is controlled by a controller (not shown). The bridge drivers apply currents to a motor 6 having two sets of three phases, the two sets being independent. The current is sensed by the sensors 1,2 as the different low side MOSFETs 7 are switched on, and by sampling the current at the appropriate time the different current in the different phases can be sampled independently from the other phases. Alternatively 3 separate sense resistors can be used, one for each low side MOSFET.

The shortcomings of such a dual bridge and dual current sensor design are that during a fault, the current in the faulted circuit can be unknown if it's no longer conducting through the current sense device. This can occur if the fault is a short circuit on the high side of the bridge switches and current sense is employed on the low side switches. This situation is illustrated in prior art FIG. 2 of the drawings which shows the current path (dotted line in FIG. 2) in the event of a high-side short circuit MOSFET 9 (marked with a cross). In this event the controller turns off all the MOSFET's and the current flows through the body diodes of the non-fault, high-side MOSFET's 10. This figure shows how the current no longer passes through the current sense resistor 1 preventing the controller from measuring the fault current.

BRIEF SUMMARY OF THE INVENTION

It is a feature of the present invention to provide a motor circuit that provides resilience in the event of a fault that ameliorates some of the short comings of prior art dual current sensor layouts of the kind shown in FIG. 1.

According to a first aspect the invention provides a motor circuit for driving one or more motors, the one or more motors which in combination include at least two independent sets of windings forming N phases, where N is equal to 3 or higher, and in which each of the N phases of a first one of the sets of phase windings is paired with a respective phase of the N phases of a second one of the sets of phase windings, the circuit comprising:

a first bridge driver circuit comprising for each phase of a first one of the sets of phase windings a top side switch and a bottom side switch, a second bridge driver circuit comprising for each phase of a second of the sets of phase windings a top side switch and a bottom side switch, a first current determining means for determining the current flowing in each phase of the first set of phase windings independent of the current flowing in the second set of phase windings a second current determining means for determining the current flowing in each phase of the first set of phase windings independent of the current flowing in the first set of phase windings; and a third current determining means for determining the sum of the current flowing in each of the N pairs of phase windings of the motor.

The circuit of the invention incorporates phase current sensing that measures the combined current from both lanes in a single reading which may then be combined with the current signals from one of the first and/or second current determining means to determine the current flowing in the other set of phases even when a short circuit has occurred across the phases or the arms of the driver.

The present invention provides an arrangement of current determining means which allows the current in each phase of both lanes to be determined even when one lane is faulty.

The circuit may include at least one current controller that generates pulse width modulated signals to be applied to the switches of at least one of the two bridge drivers. The controller may generate these signals as a function of a motor speed demand signal or a motor torque demand signal. The controller may receive as an input the phase currents for the two sets of phases.

Preferably two controllers are provided, one for each bridge driver. Each may receive as an input the signals from the associated first or second current determining means and the third current determining means.

The two controllers, where provided, may be configured so that during normal operation one or both produce modulation signals for their respective bridge drivers or only one is in operation and the other is disabled, and in the event of a fault being detected in one lane the controller of the faulty lane is disabled and the controller of the non-faulty lane provides modulation signals for its associated bridge driver.

Each controller may include a calculation means that determines the current flowing in the phases of the other one of the two lanes by combining the measured current with information on the current flowing in its associated lane, for example by subtracting the current determined by the associated first or second determining means from the total current as determined by the third current determining means.

The calculation means may comprise a digital processing circuit.

Each of the two controllers may be arranged in use to control the current in its associated phases as a function of the current flowing in the non-functioning lane to enable the effect of current flowing in the non-functioning lane on the performance of the motor to be at least partially or fully cancelled out.

Each of the controllers may therefore generate a set of control signals for the associated bridge driver and may modify the signals by an amount to compensate for the effect of current flowing in the phases associated with the other lane. The controller may modify the signals by adding or subtracting a set of compensating signals.

Each of the controllers may include a means for determining that the associated lane is faulty and/or determining that the other lane is faulty. The controller may be arranged to act in the following manner:

when the associated lane is determined to be faulty the controller may stop generating modulation signals for the bridge driver of the associated lane;

when the associated lane is determined to be not-faulty but the other lane is determined to be faulty the controller may continue to produce modulation signals and may modify those signals to compensate for any current flowing in the phases of the faulty lane.

The fault determining means may, in an alternative arrangement, comprise a watchdog circuit that is provided outside of the controllers which may determine a fault leading to a loss of a lane.

For example, in the case of a short circuit winding the controller for the non-faulty lane may be able to mitigate for the effects of the faulted lane regardless of the characteristics of the fault, for instance a resistive short across a MOSFET will lead to a different level of winding current, and hence damping torque. By enabling the system to still measure the phase current this can be accurately accommodated.

The controller or controllers may be adapted in use to detect a fault in their associated lane or the other lane based on the signals received from the current determining means.

Each of the first and second current determining means may comprise a single current sensor resistor provided in a common path from each phase of the set of phases to the supply or the earth.

The third current sensing means may comprise, for at least N−1 of the N phases, a Hall Effect current sense device where the magnetic field around the two paired phases windings is sensed by a Hall Effect sensor.

The invention may be used to drive a single motor having a dual lane configuration in which the motor is provided with two independent sets of phase windings.

The invention may therefore provide, in combination, the motor drive circuit of the present invention and a dual lane motor that is driven by the motor drive circuit.

Other advantages of this invention will become apparent to those skilled in the art from the following detailed description of the preferred embodiments, when read in light of the accompanying drawings.

DETAILED DESCRIPTION OF THE INVENTION

Figure 1:
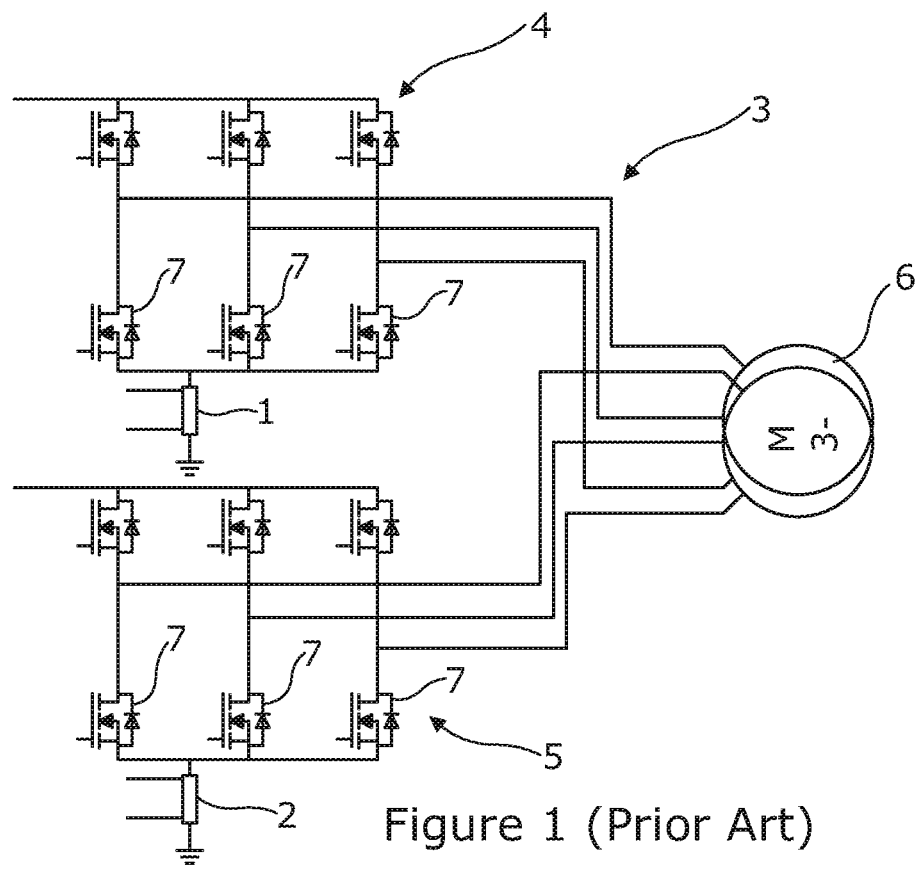
FIG. 1 is a schematic of a prior art dual lane motor circuit and motor that includes a standard current sense technique.
Figure 2:
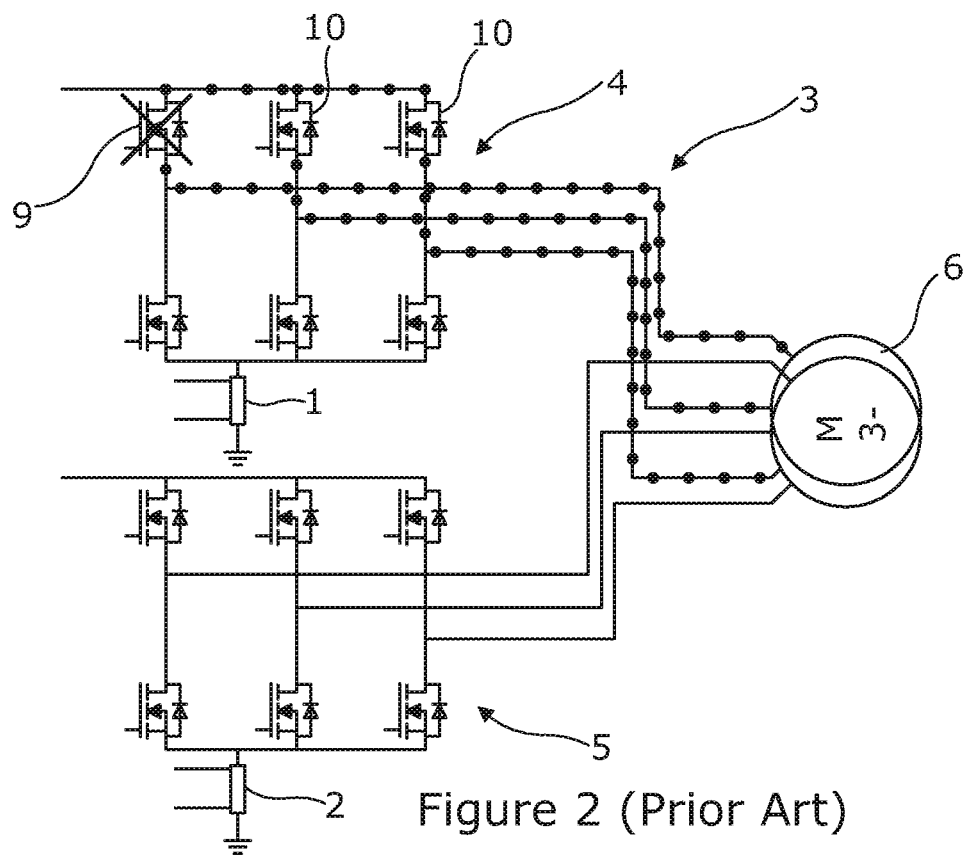
FIG. 2 shows a possible path for current flowing caused by short circuit MOSFET of one of the lanes of the circuit of FIG. 1 where the current is not detected by the current sensors.
Figure 3:
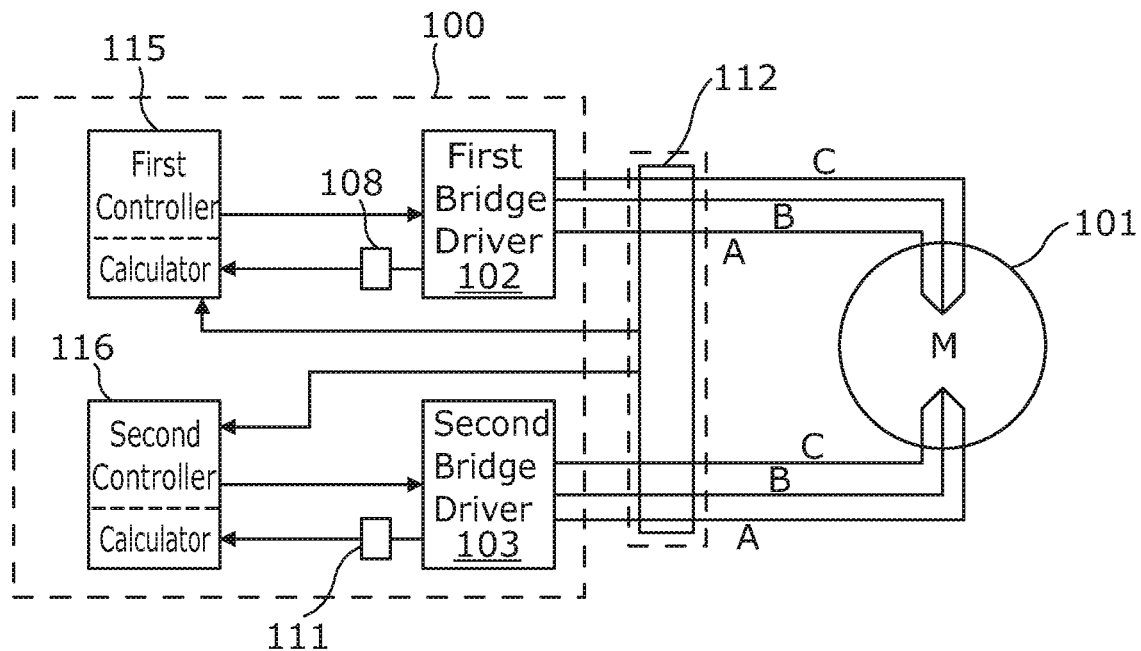
FIG. 3 is an overview of the key parts of an embodiment of a motor control and drive circuit in accordance with the invention driving a three phase dual wound electric motor.

FIG. 3 shows schematically a motor circuit 100 for control and drive of a three phase dual wound electric motor 101. The electric motor in this example is a dual wound three phase motor, so it has two sets of three phases. Each phase comprises one or more motor windings. The three phases are arranged in pairs, A-A, B-B and C-C. For convenience it is considered that the two sets of windings forming the two sets of windings are identical such that driving the motor by applying currents to one set of phase windings will produce the same performance of the motor as would be produced if the currents were applied to the other set. The two sets of phase windings are fully independent so that a short across any of the phases of one set will not affect the other set. The motor could have more than three phases, and indeed could have any number of phases N where N is an integer of 3 or higher. As shown each of the two sets of phases are connected in a star configuration at a common star point, i.e. two independent star points. Indeed, the invention will cover an arrangement in which there are two motors arranged in series or parallel, each one being provided with N phases that each comprise one or more motor windings.

The motor circuit 100 comprises two drive bridges 102, 103, one for each set of phases. These are shown in more detail in FIG. 4. A first bridge driver circuit 102 comprises for each winding of a first one of the sets of phase windings a top side switch 104 and a bottom side switch 105. The top side switches connect a phase to the positive supply 106 and the bottom switches 105 connect a phase to the earth line, for instance to the chassis of a vehicle fitted with the motor 101. All of the bottom switches are connected to the earth line 107 through a common first current determining means 108, which as shown comprise s a current sense resistor and a circuit for measuring the voltage dropped across the resistor.

A second bridge driver circuit 103 is also provided which in this example is identical to the first bridge driver circuit apart from being connected to the second set of phases of the motor 101. The top side switches 109 of the second bridge driver circuit connect to the positive supply rail 106 and the bottom side switches 110 of the second bridge driver are connected to the earth line 107 through a second common current determining means 111, which as shown comprise s a current sense resistor and a circuit for measuring the voltage dropped across the resistor. Of course, each lane could be connected to its own earth and supply rather than a shared supply and earth.

The two current sense resistors enable the current flowing in the respective set of phase windings to be determined. By suitable selection of pulse width modulation signals for the bridge switches the individual currents in each phase can be determined, as is well known to the person skilled in the art.

In addition to the two current sense resistors, the circuit also includes a third current determining means 112 for determining the sum of the current flowing in each of the N pairs of phases of the motor. This can best be seen in FIG. 4 where it is outlined by a dashed line.

Figure 4:
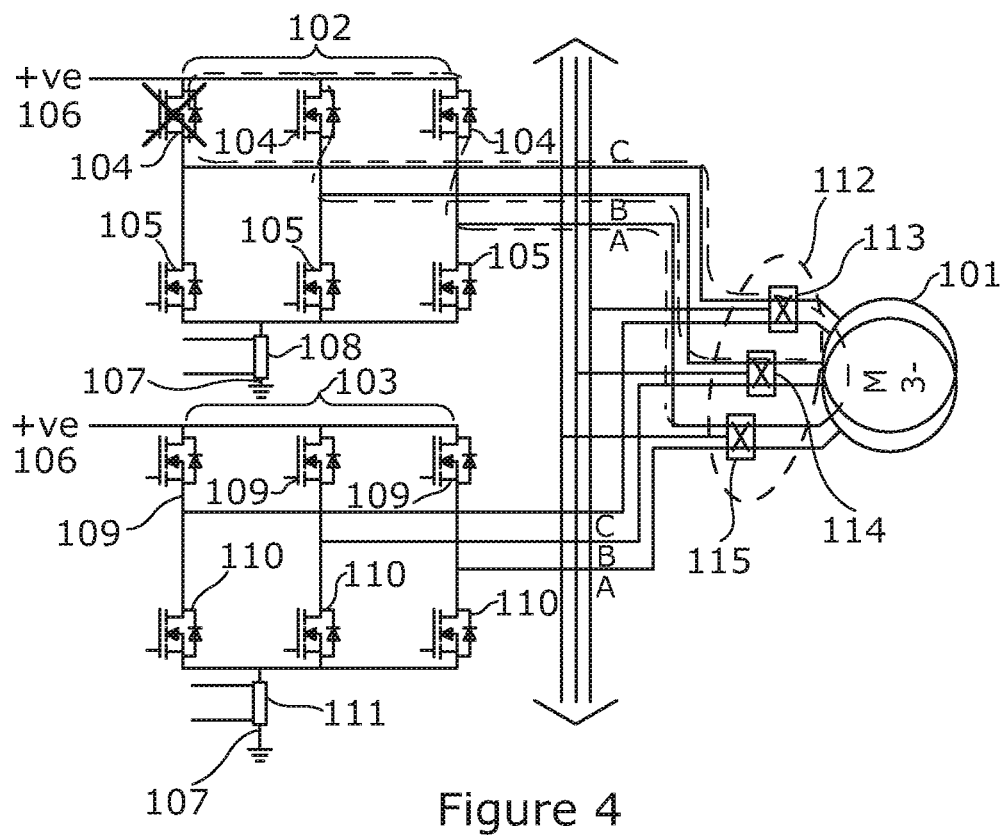
FIG. 4 is a schematic of the embodiment of FIG. 3 showing the arrangement of the switches of the bridge drivers and the locations of a single shared phase current sense measurement for both lanes.

As shown in more detail in FIG. 4, the third current determining means in the example comprises three phase current measurement sensors 113, 114, 115 each one associated with a respective matching pair of phases A-A, B-B or C-C for both lanes. This means that the phase current measurement determined by each of sensors of the third current determining means is a sum of the current flowing in the two associated phases.

The two bridge drivers 102, 103 are controlled in this example using respective controllers 115,116 as shown in FIG. 3. Each controller provides a set of pulse width modulated drive signals to the switches of the bridge driver, the signals being chosen to generate a required speed or torque from the motor.

The current signals from the first current determining means 108 and the third current determining means 112 are transmitted to the controller 115 for the first bridge driver. The current signals from the second current determining means 111 and the third current determining means 112 are transmitted to the controller for the second bridge driver. The signals may comprise analogue signals, with the controller sampling the signal to provide a digitized current measurement.

In the event of a fault with one of the bridges, for instance with a switch of the first bridge driver circuit as shown in FIG. 4, the fault current can be measured by the controller subtracting the healthy lane current measured by the current sense resistor 108 from the shared phase current measurement. The controller includes a calculator for performing the required subtraction.

Figure 5:
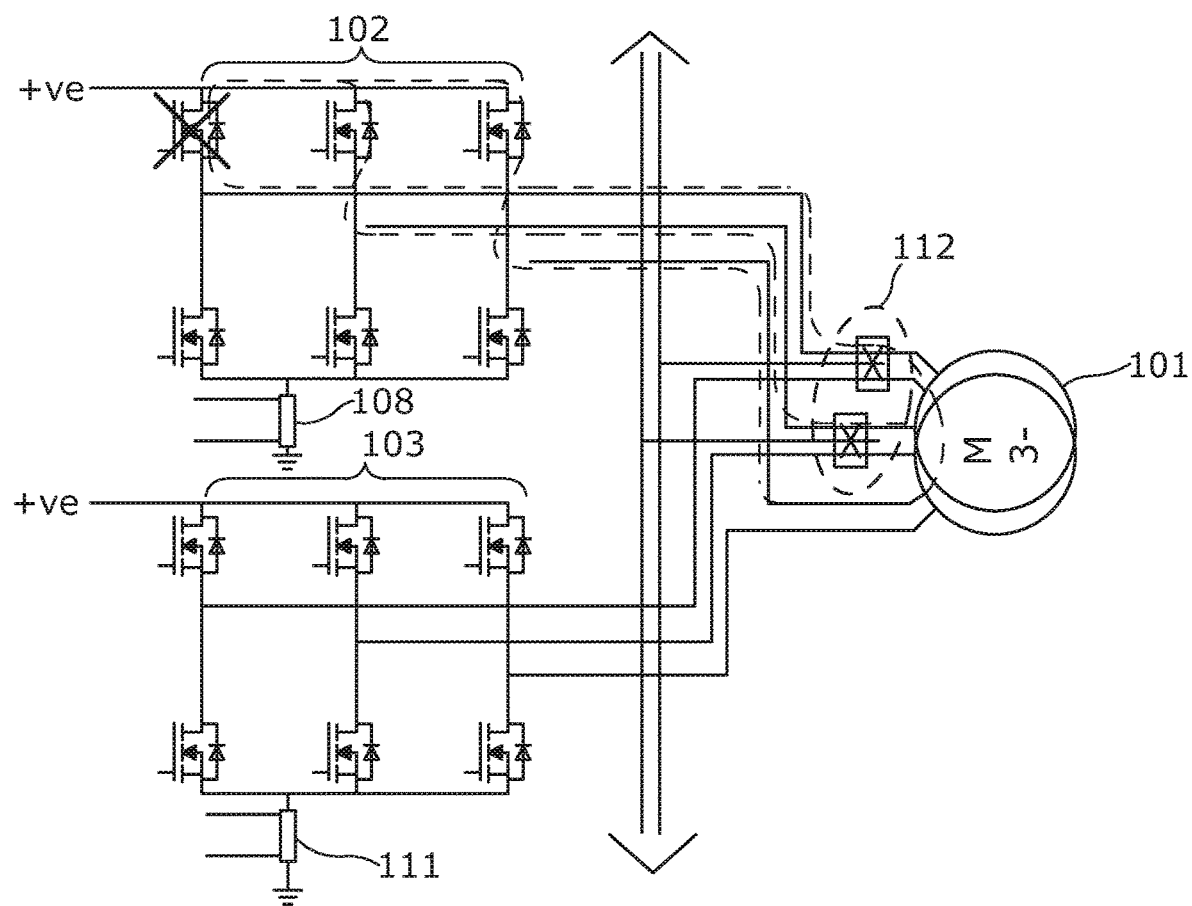
FIG. 5 is a schematic of a second embodiment of the present invention in which the current is sensed with only two phase measurements.

FIG. 5 shows the option to reduce the number of phase current measurements to 2 by using 2 current sensors associated with a respective 2 of the 3 phases, and to then calculate the 3rd based on the assumption that the sum of all 3 has to equal zero. This doesn't allow the measurement of fault currents caused by a winding to chassis fault, where the fault current can flow through multiple paths. In this case the fault current flowing through the chassis still has to return to the motor so the fault current in the un measured phase can be calculated based on the third current determining means combined with the first or second current determining means, where the unmeasured phase current is the sum of the third means minus the first or second means.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A motor circuit for driving one or more motors, the one or more motors which in combination include at least two independent sets of windings forming N phases, where N is equal to 3 or higher, and in which each of the N phases of a first one of the sets of phase windings is paired with a respective phase of the N phases of a second one of the sets of phase windings, the circuit comprising:
  a first bridge driver circuit comprising for each phase of a first one of the sets of phase windings a top side switch and a bottom side switch;
  a second bridge driver circuit comprising for each phase of a second of the sets of phase windings a top side switch and a bottom side switch;
  a first current determining means for determining a first current at an input side of the first bridge driver circuit between the first bridge driver circuit and a positive supply rail or an earth line of a power supply corresponding to each phase of the first set of phase windings independent of a current flowing in the second set of phase windings;
  a second current determining means for determining a second current at an input side of the second bridge driver circuit between the second bridge driver circuit and the positive supply rail or the earth line of the power supply corresponding to each phase of the second set of phase windings independent of a current flowing in the first set of phase windings;
  a third current determining means comprising N current measurement sensors, each of the N current measurement sensors being associated with a matching pair of phases of the first one and second one of the sets of phase windings, and each of the N current measurement sensors configured to determine a respective sum of currents flowing between the matching pair of phases of the first one and the second one of the sets of phase windings; and
  at least one current controller configured to determine:
    a fault in the first bridge driver circuit by subtracting the second current from the respective sum of the currents, or
    a fault in the second bridge driver circuit by subtracting the first current from the respective sum of the currents.

2. The motor circuit according to claim 1 wherein the at least one current controller is configured to generate pulse width modulated signals to be applied to the switches of at least one of the first and second bridge driver circuits.

3. The motor circuit according to claim 1 in which two controllers are provided, one for each of the first and second bridge driver circuits, and in which each controller in use receives as an input the signals from the associated first or second current determining means and the third current determining means.

4. The motor circuit according to claim 3 in which the two controllers are configured so that during normal operation one or both produce modulation signals for their respective bridge driver circuits and in the event of a fault being detected in one lane the controller of the faulty lane is disabled and the controller of the non-faulty lane provides modulation signals for its associated bridge driver circuit.

5. The motor circuit according to claim 3 in which each controller includes a calculation means that determines the current flowing in the phases of the other one of the two lanes by combining the measured current with information on the current flowing in its associated lane.

6. The motor circuit according to claim 5 in which the calculation means comprises a digital processing circuit.

7. The motor circuit according to claim 3 in which each of the two controllers is arranged in use to control the current in its associated phases as a function of the current flowing in the non-functioning lane to enable the effect of current flowing in the non-functioning lane on the performance of the motor to be at least partially or fully cancelled out.

8. The motor circuit according to claim 7 in which each of the controllers in use generates a set of control signals for the associated bridge driver circuit and modifies the signals by an amount to compensate for the effect of current flowing in the phases associated with the other lane.

9. The motor circuit according to claim 8 in which each controller in use modifies the signals by adding or subtracting a set of compensating signals.

10. The motor circuit according to claim 3 in which each of the controllers includes a means for determining that the associated lane is faulty and/or determining that the other lane is faulty.

11. The motor circuit according to claim 1 in which each of the first and second current determining means comprises a single current sensor resistor provided in a common path from each phase of the set of phases to the supply or the earth.

12. The motor circuit according to claim 1 in which the third current sensing means comprises, for at least N−1 of the N phases, a Hall Effect current sense device where the magnetic field around the two paired phases windings is sensed by a Hall Effect sensor.

* * * * *